United States Patent Office 2,903,491
Patented Sept. 8, 1959

---

2,903,491
PRODUCTION OF CYCLOOCTATETRAENE

Walter Reppe, Heidelberg, and Franz Reicheneder, Karl Dury, and Hubert Suter, Ludwigshafen (Rhine), Germany, assignors to Badische Anilin- & Soda-Fabrik Aktiengesellschaft, Ludwigshafen (Rhine), Germany No Drawing. Application June 4, 1957
Serial No. 663,338
Claims priority, application Germany June 5, 1956
15 Claims. (Cl. 260—666)

This invention relates to a new and improved process for the production of cyclooctatetraene in the presence of an activator, the said activator consisting of a solution of a compound of a metal of the third group of the periodic system which has been pretreated with acetylene.

It has heretofore already been known that cyclopolyolefines, especially cyclooctatetraene, can be prepared by cyclizing polymerization of acetylene and acetylene derivatives under the specific influence of nickel catalysts in the presence of a solvent at elevated temperature and increased pressure.

Thus the German patent specification No. 859,464 describes the production of cyclooctatetraene and other cyclic polyolefines in discontinuous or continuous operation. Besides the use of different kinds of solvent and of nickel and cobalt compounds as catalysts, there are therein recommended as activating additions various amines and metals or compounds of the metals of the first and second groups of the periodic system which also catalytically accelerate other reactions of acetylene.

U.S.A. patent specification No. 2,579,106 describes the coemployment of organic antioxidants and of reducing alkali and alkaline earth metal compounds in the synthesis of cyclooctatetraene. In U.S.A. patent specification No. 2,613,231 the use of nickel monocyanide as catalyst is claimed. Finally British patent specification No. 706,629 describes, in addition to the catalysts claimed in the said German patent specification No. 859,464, the use of derivatives of copper, zinc and manganese for this purpose.

All these known methods permit the production of cyclooctatetraene under the conditions described. On a continuous technical scale, however, it is found that the speed of the absorption of acetylene and the yields fluctuate. It is true that an increase in temperature increases the speed of the absorption of acetylene, but it also leads to increased resin formation.

We have now found that the formation of cyclooctatetraene in the presence of a solvent while heating, from acetylene under the catalytic influence of nickel or its compounds proceeds even at considerably lower temperatures at a reaction speed not hitherto attained by adding to the reaction mixture as an activator a solution of a compound of an element of the third group of the periodic system which has previously been treated with acetylene or a derivative thereof at about 90 to 180° C. and atmospheric or increased pressure.

Useful activators of the said type are compounds of the elements of the third group of the periodic system, these compounds being derived from a weak acid in accordance with the modern concept of an acid by the Lewis theory (cf. Wiberg, Lehrbuch der anorg. Chemie, edition 32 and 33, 1953, pp. 171–172; i.e. used in Meerwein-Ponndorf reductions (Org. Reaction, vol. 2, page 178)), aluminum and thallium alcoholates and enolates, and also alanates and alanes and their derivatives are especially suitable; thus there may be used for example aluminum ethylate, isopropylate, secondary butylate, and aceto-acetic ester enolate, acetylacetonate, thallium acetyl acetonate, lithium-, sodium- and calcium alanate, ethoxy ethyl chloralane or ethoxy ethyl ethinyl alane. The alanates and alanes are derivatives of aluminum hydride; for example, calcium alanate can be represented by the formula $$Ca(AlH_4)_2$$

and ethoxy ethyl chloralane can be represented by the formula

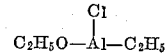

These compounds are more fully discussed in Hollemann-Wiberg, "Lehrbuch der anorganischen Chemie" (Textbook on Inorganic Chemistry), 34th to 36th printing (1955), p. 387.

When such compounds are added without pretreatment to the reaction mixture, only a slight increase in the reaction speed can be observed. If, however, these compounds are pretreated in a solvent suitable for the cyclooctatetraene synthesis, for example benzene or tetrahydrofurane, alone at a temperature of about 90 to 180° C., preferably at 120 to 145° C., with acetylene, and only then mixed with the nickel compounds usually employed as catalysts for the cyclooctatetraene synthesis, a considerable increase in the absorption of acetylene can be observed even at low temperatures, as for example at 30° to 120° C. This leads to a strong suppression of undesirable side reactions and consequently to an increase in the yield of cyclooctatetraene.

For the pretreatment of the activators with acetylene any suitable gas containing acetylene, such as mixtures of acetylene with inert gases, as for example mixtures of acetylene with nitrogen or acetylene with propane or also acetylene itself can be used. In a preferred embodiment of our invention the same gases containing acetylene are used for the pretreatment of the activators as in the subsequent synthesis of cyclooctatetraene. The pressure may range from normal to several hundred atmospheres, say up to 300 atmospheres, given a corresponding thinning of the acetylene. It is advantageous to operate at increased pressure, conveniently at the pressure at which the synthesis will later be carried out to thus simplify the process, especially when this is carried out continuously.

For being pretreated the activators are generally used in the form of solutions of from 0.05 to 2.5 percent strength. Solutions of mixtures of the activators may also be used.

A preferred method of carrying out the process discontinuously is as follows: Solutions with from 0.4 to 1 percent by weight of any of the said activator compounds are fed into a pressure vessel, as for example a rolling bomb or an autoclave. After expelling the air with nitrogen, nitrogen at a pressure of 5 atmospheres and acetylene are forced in until a total pressure of 7 to 12 atmospheres has been set up. The bomb or autoclave is then heated to reaction temperature. This done acetylene is pressed in, desirably with agitation, until a total pressure of 25 to 27 atmospheres has been attained. When the pretreatment is finished, the catalyst and the co-catalyst, if any, may be fed into and the synthesis carried out in the same reactor.

A preferred embodiment of our invention in the event the process is carried out in a continuous manner is as follows: In this case the preferred strength of the solutions used for the pretreatment is from 0.2 to 0.6 percent. The solutions are pumped into a high pressure reactor which is series-connected with the high pressure reactor in which the synthesis is to be carried out, and treated with acetylene-nitrogen mixtures (20:80 percent) at synthesis pressure and raised temperature. The said high pressure reactor for the pretreatment of the solutions can be used as a packed trickling tower, for example a ring-packed tower, or as a sump-phase reactor. The pretreated activator solution coming from the pretreatment reactor is fed into the synthesis reactor together with the synthesis gas. This can be achieved in simple manner by allowing the solution to run from the pretreatment reactor into the synthesis reactor. In special cases the pretreatment of the activator solution can also be accomplished apart from the synthesis process. In this case, the activator solution is fed into the synthesis reactor by means of a special high pressure pump, for example a sludge pump, which can also convey suspended solids if any.

The two techniques aforedescribed are intended to serve as examples only for the accomplishment of the process in accordance with our invention, the method of pretreating the activators and the activators pretreated as hereinbefore described being applicable in any conventional process for the cyclooctatetraene synthesis.

The production of the activators can be carried out by reacting an aluminum or thallium compound, for example their halides, dissolved in an organic solvent with a metal compound of acetylene or a derivative thereof. The activators thus obtained are fed into the reactor together with the catalysts and the co-catalysts, if any.

A further advantage of the coemployment of such activators is their selective influence on the catalyst, which becomes evident in a remarkable stability in the course of the reaction.

This selective influence of the activators on the catalyst is further enhanced by the addition of co-catalysts. Compounds of the elements of the 4th group of the periodic system are suitable for this purpose, for example organic silicon compounds, such as tetraalkyl silanes, tetraaryl silanes and dialkyldimercaptoalkyl silanes; esters of titanic acid, such as the esters of orthotitanic acid with alkanols having from 1 to 12, more specifically from 4 to 8, carbon atoms in the molecule, or organo-tin compounds, such as tetraalkyl stannanes, tetraaryl stannanes, trialkylmercaptoalkyl stannanes, dialkyldimercaptoalkyl stannanes, dialkyldimercaptoaryl stannanes, dialkyldimercaptoacyl stannanes, dialkyldithiocyanogen stannanes, esters of di- and trialkyloxy stannanes, dialkylstannane sulfide and bis(trialkylstannane) oxide, and also compounds of elements of the 5th group of the periodic system, for example organic derivatives of nitrogen, phosphorus, arsenic and antimony, such as lactams, tertiary amides, open-chain amides, trialkyl- and triarylphosphine sulfides, esters of thiophosphoric acid and tetrathiophosphoric acid.

The synthesis of cyclooctatetraene from acetylene, is carried out in conventional manner, i.e. continuously or discontinuously in the presence of a solvent at increased pressure. Used for the synthesis are gases containing acetylene, such as mixtures of acetylene and an inert gas, for example a mixture of acetylene and nitrogen, acetylene and propane or acetylene and methane, or acetylene itself. Furthermore acetylene which, like electric arc acetylene is already diluted with an inert gas right from the start, can also be used, It is advantageous to predry the gas prior to using it for the synthesis, for example with caustic potash.

As solvents there are used especially inert liquids which have a high solvent power for acetylene, as for example hydrocarbons, esters, amines, amides, ketones, ethers, nitriles, sulphoxides and thioethers, especially tetrahydrofurane, dioxane or benzene. The solvent must be dry. The reaction proceeds according to the present invention even at room or moderately elevated temperature. In the usual case the temperature is between about 30° and 120° C., the preferred temperature being between 60° and 90° C., when working in a batchwise manner and between 85° and 115° C. when working in a continuous manner. The pressure may be from ten to several hundred atmospheres, say 300 atmospheres, with corresponding dilution of the acetylene.

The nickel compounds to be used as catalysts in the present process are also those usual in the cyclooctatetraene synthesis, for example nickel cyanide, nickel thiocyanate and nickel complexes of enolisable beta-dicarbonyl compounds, such as acetylacetone, acetoacetic acid esters or acetamide, and nickel salts of weak organic acids, as for example pivalate. The catalysts are used at a rate of 0.3 to 2.0 percent by weight, preferably 0.6 to 1 percent by weight with reference to the solvent.

The catalysts can be fed to the reaction zone in dissolved condition, either by themselves, if convenient together with co-catalysts, or in admixture with the activator solution.

When the operation is carried out continuously it is advantageous to feed in the catalyst solution, this having been saturated with pure acetylene, at a low pressure, say between 5 and 20 atmospheres, apart from the activator solution. This increases the acetylene feed in the reaction zone.

The catalysts can also be applied to suitable carriers, such as silica gel, alumina, activated charcoal, pumice or fuller's earth and used in the reaction zone either in a mobile condition or as a fixed catalyst bed. In this case also the activator solution is supplied separately.

By the coemployment of activators prepared from compounds of the elements of the third group of the periodic system by special development, and the optional addition of co-catalysts of the above-mentioned kind, in accordance with this invention, it has become possible greatly to accelerate the cyclising polymerization of acetylene and its derivatives to cyclo-polyolefines effected by nickel compounds while lowering the reaction temperature, and to increase the yields.

The following examples will further illustrate this invention but the invention is not restricted to these examples. The parts specified in the examples are parts by weight, unless otherwise stated.

*Example 1*

A solution of 2.5 parts of aluminum isopropylate in 400 parts of anhydrous tetrahydrofurane free from peroxide is charged into a one liter stainless steel pressure reactor. After expelling the air by nitrogen, there are forced in nitrogen up to 5 atmospheres pressure and acetylene to a total pressure of 12 atmospheres. The whole is heated to 110° to 120° C. and acetylene is forced in at this temperature to a total pressure of 25 to 27 atmospheres which is continually replenished. The reaction is discontinued after 50 atmospheres of acetylene have been absorbed in all.

After cooling and releasing the pressure, a solution of 6 parts of nickel acetylacetonate in 20 parts of tetrahydrofurane is introduced. The reactor is flushed with nitrogen and 5 atmospheres of nitrogen are forced in and then acetylene up to a total pressure of 12 atmospheres. The whole is then heated at 65° to 75° C. and acetylene forced in up to a total pressure of 25 to 27 atmospheres. This pressure is maintained by continuously feeding in fresh acetylene at the rate the acetylene is used up by the reaction. After 40 hours, the whole is allowed to cool, released from pressure and filtered. The filtrate is fractionally distilled. 90 to 110 parts of cyclooctatetraene are obtained.

*Example 2*

A solution of 5 parts of aluminum acetoacetic acid ester enolate in 160 parts of tetrahydrofurane in a 0.5 liter pressure reactor is developed with acetylene in the way described in paragraph 1 of Example 1. After adding 5 parts of nickel acetylacetonate, the procedure of the second paragraph of Example 1 is followed. With the remaining conditions identical, there are obtained 40 to 50 parts of cyclooctatetraene after a reaction time of 25 hours.

*Example 3*

A solution of 2.5 parts of calcium alanate in 460 parts of tetrahydrofurane in a one liter iron pressure reactor is developed with acetylene in the way described in Example 1. After adding 5 parts of nickel acetylacetonate in 20 parts of tetrahydrofurane, the procedure of paragraph 2 of Example 1 is followed. 65 to 80 parts of cyclooctatetraene are obtained in 20 hours.

The examples grouped together in the following table are carried out in an analogous way, THF being an abbreviation for tetrahydrofurane:

| No. | Volume of the pressure reactor (liters) | For the production of the activator according to paragraph 1 of Example 1 there is used— | As catalysts according to paragraph 2 of Example 1 there serve— | Time in hours | Yield of cyclooctatetraene (parts) |
|---|---|---|---|---|---|
| 4 | 1 | 2.5 parts of aluminum isopropylate in 400 parts THF. | 6 parts of nickel acetoacetic acid ester enolate in 16 parts THF. | 16 | 30-40 |
| 5 | 1 | 3 parts of aluminum acetylacetonate in 460 parts of THF. | 5 parts of nickel acetylacetonate in 20 parts of THF. | 40 | 65-70 |
| 6 | 3 | 18 parts of aluminum acetoacetic acid ester enolate in 1200 parts of THF. | 18 parts of nickel acetylacetonate and 4 parts of di-normal-butyl-bis-(dodecylmercapto)-stannane in 240 parts of THF. | 16 | 320-340 |
| 7 | 3 | 3 parts of 50% calcium alanate in 1,200 parts of THF. | as in 6 | 16 | 250-270 |
| 8 | 4.5 | 30 parts of 25% calcium alanate in 2,200 parts of THF. | 20 parts of nickel acetylacetonate and 5 parts of tetraphenyl stannane. | 40 | 380-400 |
| 9 | 4.5 | as in 8 | as in 8 | 20 | 240-250 |
| 10 | 4.5 | 15 parts of aluminum isopropylate in 2,200 parts of THF. | as in 8 | 24 | 170-190 |
| 11 | 1 | 5 parts of aluminum acetoacetic acid ester enolate in 480 parts of THF. | 5 parts of nickel acetylacetonate and 1 part of tetraphenyl stannane. | 60 | 160 |
| 12 | 1 | 3 parts of aluminum isopropylate in 400 parts of THF. | 6 parts of nickel acetylacetonate and 3 parts of di-normal-butyl-bis-(dodecylmercapto)-stannane in 16 parts of THF. | 40 | 80-90 |
| 13 | 1 | 2.5 parts of aluminum isopropylate in 400 parts of THF. | as in 12 | 40 | 95-130 |
| 14 | 1 | as in 13 | 6 parts of nickel acetyl acetonate and 2 parts of tributyl stannane acetoacetic ester enolate in 16 parts of THF. | 16 | 50-70 |
| 15 | 1 | as in 13 | 6 parts of nickel acetoacetic acid ester enolate and 2 parts of tributyl stannane acetoacetic acid ester enolate in 16 parts of THF. | 16 | 40-50 |
| 16 | 0.25 | 1 part of aluminum isopropylate in 80 parts of THF. | 2.5 parts of nickel acetylacetonate and 1 part of dibutyl tin-bis-thio-acetate in 16 parts of THF. | 16 | 10-12 |
| 17 | 0.25 | as in 16 | 2.5 parts of nickel acetylacetonate and 1 part of bis-tri-butyltin oxide in 16 parts of THF. | 14 | 12-15 |
| 18 | 0.25 | as in 16 | 2.5 parts of nickel acetylacetonate and 0.5 part of dibutyl tin sulphide in 16 parts of THF. | 12 | 8-11 |
| 19 | 0.25 | as in 16 | 5 parts of nickel acetylacetonate and 1 part of dibutyltin dithiocyanate in 16 parts of THF. | 20 | 8-11 |
| 20 | 0.25 | as in 16 | 2.5 parts of nickel acetylacetonate and 1 part of dibutyltin-bis-acrylate in 16 parts of THF. | 14 | 8-11 |
| 21 | 0.25 | as in 16 | 2.5 parts of nickel acetylacetonate and 1 part of di-normal-butyl-bis-(phenyl-mercapto)-stannane in 16 parts of THF. | 16 | 8-11 |
| 22 | 0.25 | as in 16 | 2.5 parts of nickel-acetyl-acetonate and 1 part of tributyltin stearate in 16 parts of THF. | 11 | 8-10 |
| 23 | 0.25 | 1 part of thallium acetylacetonate in 80 parts of THF. | 2.5 parts of nickel acetylacetonate and 1 part of di-normal-butyl-bis-(dodecylmercapto)-stannane in 16 parts of THF. | 19 | 8-10 |
| 24 | 0.25 | 1 part of ethoxy-ethylchloralane in 80 parts of THF. | as in 23 | 15 | 8-9 |
| 25 | 0.25 | 1 part of ethoxy ethylethinylalane in 80 parts of THF. | 2.5 parts of nickel cyanide and 1 part of di-normal-butyl-bis-(dodecylmercapto)-stannane in 16 parts of THF. | 15 | 10-13 |
| 26 | 0.25 | 1 part of aluminum ethylate in 80 parts of THF. | 2 parts of nickel acetylacetonate and 1 part of di-normal-butyl-bis-(dodecylmercapto)-stannane in 16 parts of THF. | 17 | 10-12 |
| 27 | 0.25 | 1 part of aluminum secondary-butylate in 80 parts of THF. | 2.5 parts of nickel acetylacetonate and 1 part of tributyl-stannane acetoacetic acid ester enolate in 16 parts of THF. | 20 | 15-18 |
| 28 | 0.25 | as in 16 | 2.5 parts of nickel acetylacetonate and 0.5 part of ethinyl stannane in 16 parts of THF. | 15 | 15-17 |
| 29 | 0.25 | as in 16 | 2.5 parts of nickel acetylacetonate and 1 part of di-normal-butyl-bis-(dodecylmercapto)-silane in 16 parts of THF. | 8 | 8-9 |
| 30 | 0.25 | as in 16 | 2.5 parts of nickel acetylacetonate and 1 part of tetra-(butoxy)-titanium in 16 parts of THF. | 17 | 10-12 |
| 31 | 0.25 | as in 16 | 2.5 parts of nickel acetylacetonate and 1 part of tetra-(octyloxy)-titanium in 16 parts of THF. | 14 | 12-15 |
| 32 | 0.25 | as in 16 | 1.5 parts of nickel acetylacetonate and 1.5 parts of triphenylphosphine sulfide in 16 parts of THF. | 23 | 12-14 |
| 33 | 0.25 | as in 16 | 2 parts of nickel acetylacetonate and 1 part of triphenoxy phosphine sulfide in 16 parts of THF. | 35 | 20-22 |
| 34 | 0.25 | as in 16 | 1.5 parts of nickel acetylacetonate and 0.5 part of tri-(phenylmercapto)-phosphine sulfide in 16 parts of THF. | 10 | 18-20 |
| 35 | 1 | 2 parts of aluminum isopropylate in 220 parts of THF. | 3 parts of nickel acetylacetonate and 3 parts of diethoxythiophosphoric acid acetoacetic acid ester enolate in 20 parts of THF. | 48 | 70-90 |
| 36 | 1 | as in 35 | 3 parts of nickel cyanide and 3 parts of diethoxythiophosphoric acid acetoacetic acid enolate in 20 parts of THF. | 48 | 40-55 |
| 37 | 0.25 | 1 part of aluminum secondary butylate in 80 parts of THF. | 2 parts of nickel acetylacetonate and 1.5 parts of diethoxythiophosphoric acid acetoacetic acid ester enolate in 20 parts of THF. | 9 | 20-22 |
| 38 | 1 | 3 parts of aluminum isopropylate in 400 parts of THF. | 5 parts of nickel acetylacetonate and 5 parts of N-ethylpiperidone-(4) in 20 parts of THF. | 16 | 55-70 |
| 39 | 1 | 2 parts of aluminum isopropylate in 400 parts of THF. | 5 parts of nickel acetylacetonate and 5 parts of pyrrolidone in 20 parts of THF. | 32 | 50-60 |
| 40 | 1 | 1.5 parts of aluminum isopropylate in 400 parts of THF. | 4 parts of nickel acetylacetonate and 4 parts of propionylpropionic acid-N-benzyl-N-phenylethylamide in 20 parts of THF. | 22 | 75-95 |

Example 41

A pressure reactor of three liters capacity is charged with anhydrous tetrahydrofurane free from peroxide in which up to about 1% of nickel acetylacetonate and 0.2% of di-normal-butyl-bis-(dodecylmercapto)-stannane has been dissolved. After flushing the reactor with nitrogen and heating up to 75° C., acetylene is forced in under a pressure of 17 to 18 atmospheres. Every hour 300 cubic centimeters of the charging stock are led into the sump of the reactor and at the same time fresh acetylene is forced into the sump. Moreover 100 cubic centimeters per hour of an activator solution, prepared according to paragraph 1 of Example 1 from a solution of 32 grams of aluminum isopropylate in 2.4 liters of tetrahydrofurane, is pumped in. A corresponding amount (300 to 350 cubic centimeters) of liquid is withdrawn at the upper end of the reactor.

The formation of cyclooctatetraene begins after a few hours. The conversion gradually increases reaching its maximum yield after 2 to 3 days. The effluent contains 10 to 12% of cyclooctatetraene.

Example 42

Using a reactor as in Example 41 a mixture of acetylene and nitrogen instead of pure acetylene with 20% acetylene is forced in under a pressure of 100 atmospheres. An activator solution which has been continuously developed in a separate part of the systems is pumped in at the same rate as in Example 41, but at a temperature of 75° to 120° C.

The continuous development of the activator solution is accomplished by pumping 100 cubic centimeters per hour of a solution of 32 grams of aluminum acetoacetic acid ester enolate in 2.4 liters of tetrahydrofurane into a separate reactor heated to 110° to 150° C. in which the pressure and the composition of the gas mixture are the same as in the main reactor.

By continuous renewal of the gas mixture both in the separate and in the main reactor an acetylene level of 10–18% is maintained. The conversion corresponds approximately to that of Example 41. The yield amounts to about 85%.

Example 43

Using a reactor as in Example 41, a cyclooctatetraene is synthesized as in Example 42, dry benzene being used as solvent instead of tetrahydrofurane. The acetylene nitrogen mixture with 20% acetylene content is used under a pressure of 160 to 200 atmospheres. The conversion corresponds approximately to that in Example 41.

We claim:

1. A process for the production of cyclooctatetraene by cyclizing polymerization of acetylene, comprising the steps of pretreating a solution of activating amounts of aluminum isopropylate in anhydrous tetrahydrofurane with acetylene at a pressure of 25 to 27 atmospheres and at a temperature of about 110° to 120° C., adding to this activated solution a solution of nickel acetylacetonate in tetrahydrofurane serving as catalyst, and then treating this mixture with acetylene at about 65° to 75° C. and at a pressure of 25 to 27 atmospheres.

2. A process for the production of cyclooctatetraene by cyclizing polymerization of acetylene, comprising the steps of pretreating a solution of activating amounts of aluminum acetoacetic acid ester enolate in tetrahydrofurane with acetylene at a pressure of 25 to 27 atmospheres and at a temperature of about 110° to 120° C., adding to this activated solution a solution of nickel acetylacetonate in tetrahydrofurane serving as catalyst, and then treating this mixture with acetylene at about 65° to 75° C. and at a pressure of 25 to 27 atmospheres.

3. A process for the production of cyclooctatetraene by cyclizing polymerization of acetylene, comprising the steps of pretreating a solution of activating amounts of calcium alanate in tetrahydrofurane with acetylene at a pressure of 25 to 27 atmospheres and at a temperature of about 110° to 120° C. adding to this activated solution a solution of nickel acetylacetonate in tetrahydrofurane serving as catalyst and then treating this mixture with acetylene at about 65° to 75° C. and at a pressure of 25 to 27 atmospheres.

4. A continuous process for the production of cyclooctatetraene which comprises treating a solution of activating amounts of aluminum isopropylate in tetrahydrofurane with a gas containing acetylene and nitrogen at a pressure from 25 to about 27 atmospheres and 110° to 120° C. and leading this solution continuously to a reaction zone, which zone contains a solution of 1% nickel acetylacetonate and 0.2% di-n-butyl-bis-(dodecylmercapto-)stannane in tetrahydrofurane at a temperature of 75° C. and at a pressure of from 17 to about 18 atmospheres, while simultaneously introducing pure acetylene and a solution of 1% nickel acetylacetonate and 0.2% di-n-butyl-bis-(dodecylmercapto-)stannane into said reaction zone and withdrawing a corresponding amount of liquid reaction product therefrom.

5. In a process for the production of cyclooctatetraene by cyclizing polymerization of acetylene at elevated temperatures and elevated pressures in the presence of a nickel catalyst and in an inert liquid organic solvent, the improvement which comprises: carrying out said cyclizing polymerization in an activated solution of a metal compound selected from the group consisting of aluminum and thallium alcoholates and enolates, alanates and alanes dissolved in said inert liquid organic solvent, said activated solution being prepared prior to incorporation of the nickel catalyst by pretreatment with acetylene at a pressure of about one to 300 atmospheres and at a temperature of about 90° C. to 180° C.

6. An improved process as claimed in claim 5 in which said cyclizing polymerization is carried out with the further addition of an organic compound of an element selected from the group consisting of silicon, titanium, tin, nitrogen, phosphorus, arsenic and antimony contained in the reaction mixture as co-catalysts capable of increasing the selectivity of the nickel catalyst.

7. An improved process as claimed in claim 5 in which the nickel catalyst is a member of the group consisting of nickel cyanide, nickel thiocyanate, nickel complexes of enolisable beta-dicarbonyl compounds, and nickel salts of weak organic acids.

8. An improved process as claimed in claim 5 wherein the inert liquid organic solvent employed in the cyclizing polymerization contains about 0.3 to 2.0% by weight of said nickel catalyst and about 0.05 to 2.5% by weight of said metal compound.

9. In a process for the production of cyclooctatetraene by cyclizing polymerization of acetylene at elevated temperatures and elevated pressures in the presence of a nickel catalyst and in an inert liquid organic solvent, the improvement which comprises: pretreating a solution of a metal compound selected from the group consisting of aluminum and thallium alcoholates and enolates, alanates and alanes dissolved in said inert liquid organic solvent with acetylene at a pressure of about 1 to 300 atmospheres and at a temperature of about 90° C. to 180° C., adding to the resulting activated solution said nickel catalyst in order to provide a reaction media, and treating the reaction media with acetylene at a temperature of about 30° C. to 120° C. and at a pressure of about 10 to 300 atmospheres for cyclic polymerization of the acetylene to cyclooctatetraene.

10. An improved process as claimed in claim 9 wherein a solution of said nickel catalyst in said inert liquid organic solvent is first saturated with pure acetylene at a pressure of 5 to 20 atmospheres and then introduced into a reaction zone apart from the pretreated activated solution of a metal compound.

11. An improved process as claimed in claim 9 wherein benzene is used as the inert solvent.

12. An improved process as claimed in claim 9 wherein anhydrous tetrahydrofurane is used as the inert solvent.

13. An improved process as claimed in claim 9 wherein the metal compound dissolved in the inert solvent is aluminum isopropylate.

14. An improved process as claimed in claim 9 wherein the metal compound dissolved in the inert solvent is aluminum acetoacetic acid ester enolate.

15. An improved process as claimed in claim 9 wherein the metal compound dissolved in the inert solvent is calcium alanate.

References Cited in the file of this patent

UNITED STATES PATENTS

| | | |
|---|---|---|
| 2,700,663 | Peters | Jan. 25, 1955 |
| 2,781,410 | Ziegler et al. | Feb. 12, 1957 |

FOREIGN PATENTS

| | | |
|---|---|---|
| 706,629 | Great Britain | Mar. 31, 1954 |